US008615496B2

(12) United States Patent
Giampaolo

(10) Patent No.: US 8,615,496 B2
(45) Date of Patent: Dec. 24, 2013

(54) FILE SYSTEM RELIABILITY USING JOURNALING ON A STORAGE MEDIUM

(75) Inventor: Dominic Giampaolo, Mountain View, CA (US)

(73) Assignee: Apple Inc., Cupertino, CA (US)

(*) Notice: Subject to any disclaimer, the term of this patent is extended or adjusted under 35 U.S.C. 154(b) by 986 days.

(21) Appl. No.: 11/975,598

(22) Filed: Oct. 19, 2007

(65) Prior Publication Data

US 2009/0106758 A1 Apr. 23, 2009

(51) Int. Cl.
*G06F 17/30* (2006.01)

(52) U.S. Cl.
USPC .......... 707/648; 707/610; 707/640; 707/644; 707/645; 707/646; 707/647; 707/649; 707/650; 707/651; 707/652; 707/653

(58) Field of Classification Search
USPC .......... 707/610, 640, 645–653, 999.202–204
See application file for complete search history.

(56) References Cited

U.S. PATENT DOCUMENTS

| 5,369,757 | A  | * | 11/1994 | Spiro et al. ................. 714/19 |
| 6,668,262 | B1 | * | 12/2003 | Cook ............................. 1/1 |
| 2004/0111557 | A1 | * | 6/2004 | Nakatani et al. ............. 711/113 |

* cited by examiner

*Primary Examiner* — Syling Yen
(74) *Attorney, Agent, or Firm* — Womble Carlyle Sandridge & Rice LLP

(57) ABSTRACT

Improving file system reliability in storage mediums after a data corrupting event using file system journaling is described. In one embodiment, a method, which includes scanning beyond an active transactions region within the file system journal to locate additional valid transactions for replay to bring the storage medium into a consistent state; the scanning performed until an invalid transaction is reached.

19 Claims, 10 Drawing Sheets

Computer System
100

FILE SYSTEM RELIABILITY USING JOURNALING ON A STORAGE MEDIUM

FIELD OF THE INVENTION

The invention relates to the integrity and reliability of file systems.

BACKGROUND OF THE INVENTION

A file system journal is used to provide more efficient (and sometimes more accurate) repair of a file system in the event of a crash, power outage, or other failure to properly un-mount the file system, compared to a file system without a journal or similar mechanism. A journal is used to speed recovery when mounting a volume that was not un-mounted safely. Journaling makes it quick and easy to restore the file system data structures to a consistent state without having to scan all the structures.

In a journaling file system, a journal entry is written before each file system change, describing the change to be carried out. This allows quick recovery if the actual file change is interrupted or not carried out due to power outage or whatever. Journaling does not protect your (new) data, it just prevents inconsistencies. Data changes are written to the journal before committing the data changes to physical disk. Once the data has been safely confirmed as being on disk, the record is erased in the journal. If a failure occurs while writing to the journal, the original data is still in a consistent state except that the new, pre-crashed data that was being written is lost. What a journaling file system really protects against are situations where the power is cut off in the middle of a write, and the file system gets left in an unstable state. By using a journaling process, if the power does click off, any half-completed operations can be replayed and brought back into a stable state.

Basically, journaling ensures that when a group of related changes are being made, either all of those changes are actually made, or none of them are made. This is done by gathering up all of the changes, and storing them in a separate place (in the journal). Once the journal copy of the changes is completely written to disk, the changes can actually be written to their normal locations on disk. If a failure happens at that time, the changes can simply be copied from the journal to their normal locations. If a failure happens when the changes are being written to the journal, but before they are marked complete, then those changes are ignored.

When a file system is updated (for example, to create or delete a file), several data structures within the file system typically need to be changed. The journal is used to ensure that all or none of these changes are actually applied. The changes are all written to the journal, and the journal header is updated to indicate that all the changes have been made. After the changes to the journal and journal header have been written to disk, then those changes may be written to the normal data structures. In the event of a crash after the journal header has been written, but before the changes have been written to the normal data structures, the changes can be "replayed" by reading them from the journal, and writing to the normal data structures. This ensures that all the changes have been made. In the event of a crash before the journal header has been written, then the incomplete changes in the journal are ignored, and none of the changes will have been made to the normal data structures. Thus, every update is "all or nothing." Once all changes have been written to the normal data structures, the changes can be removed from the journal by updating the journal header. Without a journal or a similar mechanism, you would have to verify and potentially repair every data structure in the file system, which can take a very long time.

Journaling is effected by a host operating system which sends commands to a storage medium that contains a file system journal. The integrity and reliability of file system using journaling, however, require that the storage medium honor flush requests from the host operating system. Journaling is normally a two-operation commit process. The first operation is to write the data changes to the file system journal and the second step is to write the changes from the journal to their normal data structures within the physical memory space of the storage medium. This writing from the journal to the normal data structures is referred to as flushing the journal. Flushing may be performed using a flush request from the host operating system.

Unfortunately, many, if not most, commercially available data storage mediums often ignore the flush request. Instead, storage mediums cache and re-order write operations to improve performance benchmarks. That is, data storage mediums may receive a series of write requests and re-order them in such a fashion as to optimize the write operation. As a result, often times a flush request is not honored by the storage medium. This presents a problem for data integrity in a journaling system that requires the flush request to be honored. For example, when a file is created a directory entry is allocated for the file name of the new file and another data structure is allocated to maintain the information about the new file (metadata). That is, to create a new file, more than one location on the storage medium is updated. If a system crash or power outage occurs after data blocks are updated (flushed to the physical memory space of a storage medium), but before the journal header is updated (flushed), many valid transactions may have been flushed to the physical memory space of the storage medium without updating the journal header to properly demarcate where these valid transactions are. This is because the journal header, discussed infra, identifies where the valid transactions are located within the file system journal. So, when the system is brought back on-line, the journal header may be grossly out of date. This results in a loss of consistency (otherwise known as a trashed disk) within the physical memory space of the data storage medium. Thus, on storage mediums that do not honor flush requests, journaling is not effective for its intended purpose, which is to protect the storage medium from being corrupted.

SUMMARY OF THE DESCRIPTION

Methods and apparatuses for improving file system reliability using journaling on a storage medium are disclosed. In at least certain embodiments, the method includes locating additional valid transactions within a buffer of a file system journal by scanning transactions beyond an active region within the buffer, and this scanning may continue until a transaction is reached that is not valid.

BRIEF DESCRIPTION OF THE DRAWINGS

A better understanding of at least certain embodiments of the present invention can be obtained from the following detailed description in conjunction with the following drawings, in which.

DETAILED DESCRIPTION

Figure 1:
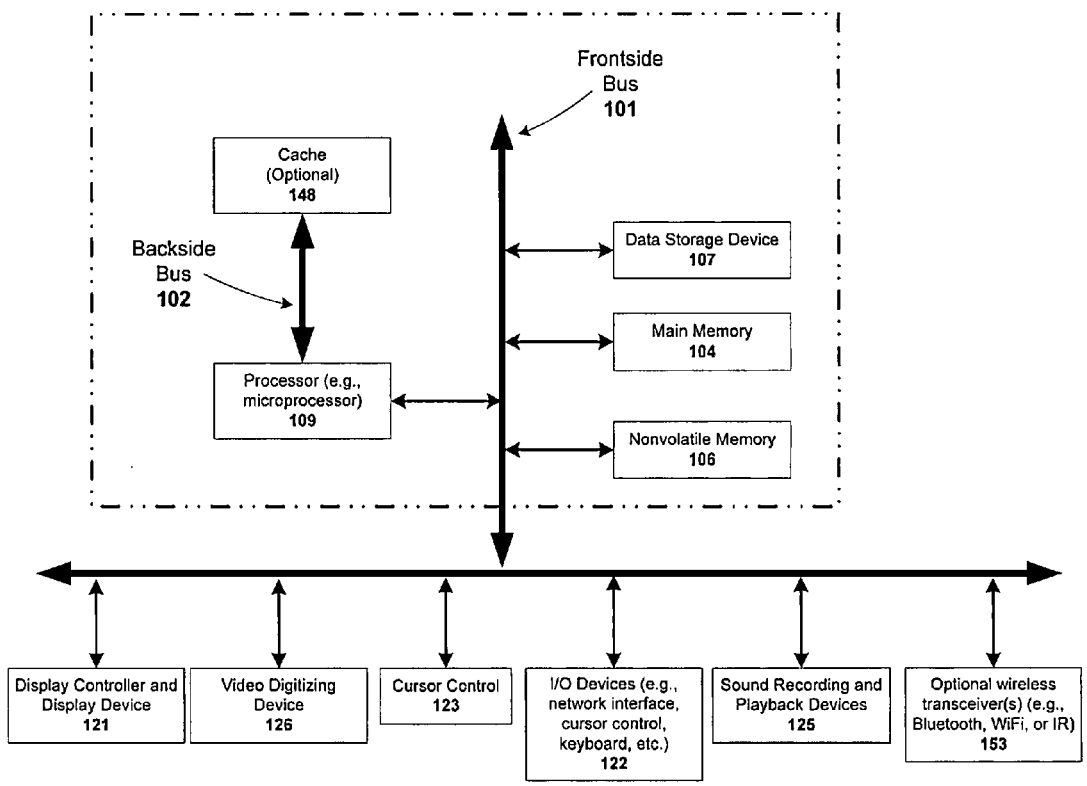
FIG. 1 illustrates an exemplary computer system upon which the methods and apparatuses of the invention may be implemented.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems will appear from the description below. In addition, the present invention is not described with reference to any particular programming language. It will be appreciated that a variety of programming languages may be used to implement the teachings of the invention as described herein.

A method and apparatus for improving file system reliability on a storage medium after a data corrupting event, such as a system crash or loss of power, using a file system journal is described. As discussed above, prior art systems often do not honor flush requests sent by the host processor. As a result, these storage mediums become corrupted because valid transactions have been written to the physical memory space of the storage medium, but the journal header is not updated so there is no record of the valid transactions that where written to the file system journal. At least certain embodiments described herein prevent this from happening by scanning beyond the active region indicated by the journal header (which may be grossly out-of-date) to locate additional valid transactions which have been written to the journal. In this way, file system reliability and integrity is restored to storage mediums that use journaling after a data corrupting event.

FIG. 1 illustrates an exemplary data processing system upon which embodiments of the present invention can be implemented. Computer system 100 comprises front-side bus 101 and back-side bus 102 (or other communications hardware and software for communicating information) coupled to processor 109 for processing information. Front-side bus 101 is a data path which runs between the CPU and main memory (RAM). Front-side bus 101 also couples data storage device 107, main memory 104, and non-volatile memory 106 to processor 109. Additionally, front-side bus 101 connects to an external bus coupling the processor to display controller and device 121, video digitizing device 126, cursor control device 123, input-output (I/O) devices 122, sound recording and playback devices 125, and optional wireless transceivers 153. Additionally, cache 148 is coupled to processor 109 via back-side bus 102. A back-side bus, such as, back-side bus 102, is the data path and physical interface between the processor and the L1 and/or L2 cache memory (not shown).

Computer system 100 further comprises a random access memory (RAM) or other dynamic storage device (referred to as main memory 104) coupled to bus 101 for storage information and instructions to be executed by processor 109. Main memory 104 also may be used for storing temporary variables or other intermediate information during execution of instructions by processor 109. Computer system 100 also comprises a read only memory (ROM) 106, and/or static storage devices coupled to bus 101 for storing static information and instructions for processor 109. Data storage device 107 is coupled to bus 101 for storing information and instructions.

Furthermore, data storage device 107 may include a magnetic disk or optical disk and its corresponding disk drive, which can be coupled to computer system 100. Computer system 100 can also be coupled, via bus 101, to display device 121 for displaying information to a computer user. Display device 121 typically includes a frame buffer, specialized graphics rendering devices, and a cathode ray tube (CRT) and/or a flat panel display. I/O device 122 including alpha numeric and other keys, is typically coupled to bus 101 for communication information and commands to processor 109. Another type of user input device is cursor control 123, such as a mouse, trackball, pin, touch screen, or cursor direction keys for communication direction information and command selections to processor 109 and for controlling cursor movement on display device 121. This input device typically has two degrees of freedom into axis, a first axis (e.g., x) and a second axis (e.g., y), which allows the device to specify positions in a plane. However, this invention should not be limited to input devices with only two degrees of freedom.

Another device that may be coupled to bus 101 is a device for sound recording and/or playback 125, such as an audio digitizer coupled to a microphone for recording information. Further, the device may include a speaker which is coupled to a digital-to-analog (D/A) converter for playing back the digitized sounds.

Also computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images and transmitted from others on the computer network.

Computer system 100 is useful for supporting computer supported cooperation (CSC—the integration of teleconferencing with mixed media data manipulation) to 2D/3D graphics, image processing, video compressions/decompression recognition algorithms and audio manipulation.

It will be understood that the various embodiments described herein may be implemented with data processing systems which have more or fewer components than system 100; for example, such data processing systems may be a cellular telephone or a personal digital assistant (PDA) or an entertainment system or a media player (e.g., an iPod) or a consumer electronic device, etc., each of which can be used to implement one or more of the embodiments of the invention.

Figure 2:
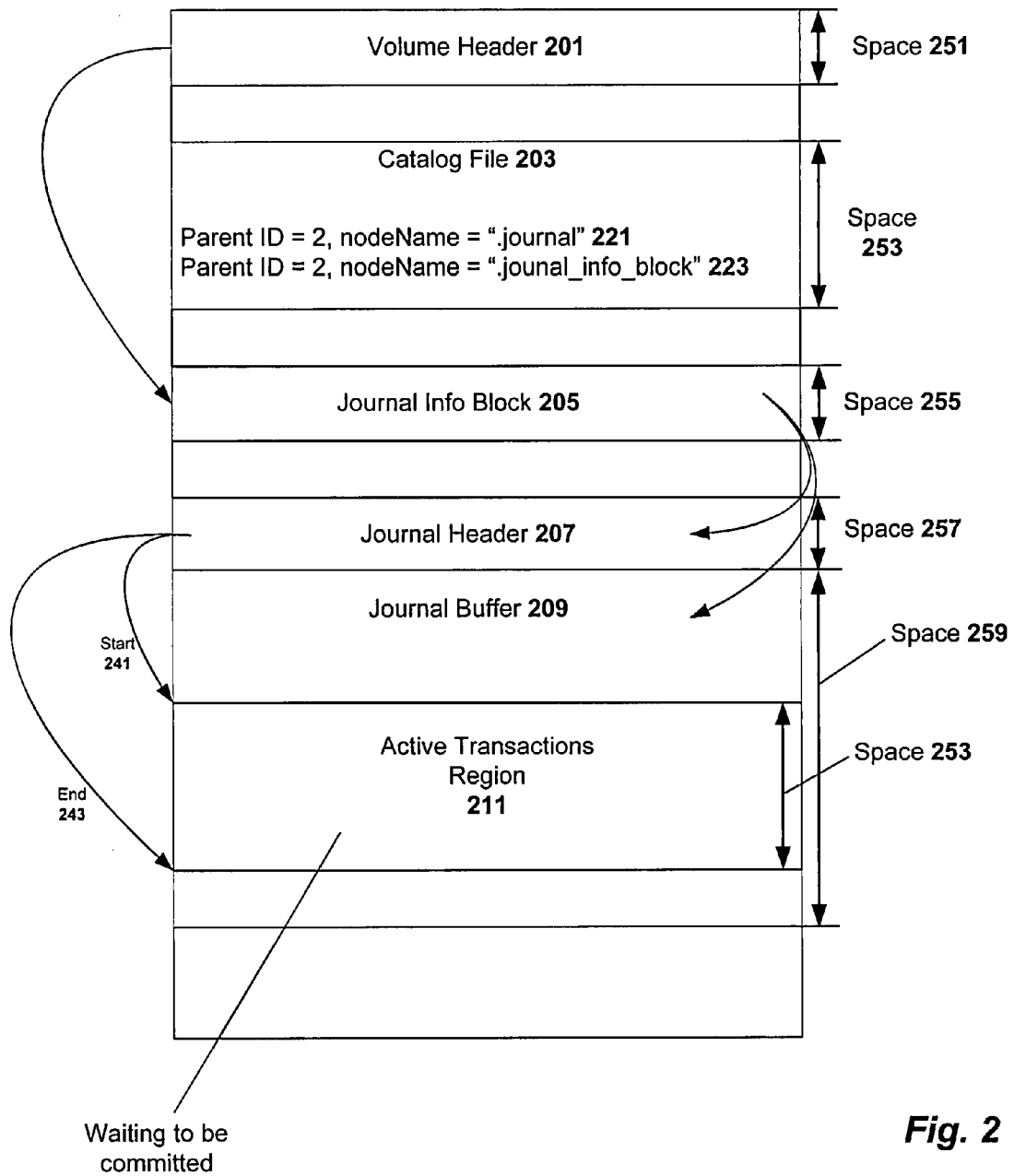
FIG. 2 illustrates an exemplary file system journal according to one embodiment of the invention.

FIG. 2 illustrates an exemplary file system journal according to one embodiment of the invention. File system journal 200 includes volume header 201, catalog file 203, journal info block 205, journal header 207, and journal buffer 209. Further, a portion of journal buffer 209 is an active transactions region 211. In the figure, the active transactions regions is shown as one contiguous space, though it need not be, and often is not, contiguous. A volume header, such as volume header 201, contains information about the volume as a whole, including key structures within the volume. Volume header 201 occupies space 251 within the allocated memory space for file system journal 200 and contains reference information that points to journal info block 205 as indicated by the arrow in FIG. 2. A catalog file, such as catalog file 203, is a special file that describes the folder and file hierarchy on a volume. Catalog file 203 occupies space 253 and contains vital information about all of the file and folders on a volume, as well as the catalog information for the files and folders that are stored in the catalog file. The catalog files are organized as a balanced tree to allow quick and efficient searches through a large folder hierarchy. In this example, catalog file 203 includes two nodes for the purposes of explanation. Catalog file 203 includes parent ID=2, nodeName=".journal" 221, and parent ID=2, nodeName=".journal_info_block" 223.

Journal info block 205 occupies space 255 of the memory space corresponding to file system journal 200. A journal info block, such as journal info block 205, is a journal data structure which describes where the journal header and journal buffer are stored. Typically, the journal info block is stored at the beginning of the allocation block referenced by the volume header as indicated by the arrow in FIG. 2. Journal info block 205 references journal header 207 and journal buffer 209. That is, the journal info block 205 indicates the location and size of both journal header 207 and the journal buffer 209.

Journal header 207 occupies space 257 of the data structure. Journal header 207 describes which part of the journal buffer 209 is active and contains transactions waiting to be committed. A transaction is a group of related changes to a file system. When all the changes of a transaction have been written to their normal locations on disk, that transaction has been committed and is removed from file system journal 200. A journal, such as file system journal 200, may contain several transactions waiting to be committed in active transactions region 211. Journal header 207 includes pointers to the beginning and end of the active transactions region 211 indicated by start 241 and end 243 arrows respectively.

Journal buffer 209 occupies space 259 of the journal data structure and, in at least certain embodiments, is treated as a circular buffer. When reading or writing the journal buffer, the I/O operation can stop at the end of journal buffer 209 and resume (wrap around) immediately following the journal header. Thus, only a portion of the journal buffer is active at any given time; this portion is indicated by the start and end field of the journal header, indicated by start 241 and end 243 pointers respectively. The part of the buffer that is not active contains no meaningful data and must be ignored. When the journal is not empty (contains transactions), it must be replayed after a power failure or system crash to be sure the volume is consistent. That is, the data from each of the transactions must be written to the correct blocks on disk. In order to replay the journal, an implementation just loops over the transactions, copying each individual block in the transaction from the journal to its proper location on the volume. When the journal is replayed, journal header 207 is updated. That is, once those blocks have been flushed to the media (not just the driver), it may update the journal header to remove the transactions.

Active transactions region 211 is within the journal buffer 209 which is the space set aside to hold the active transactions. In this example, active transactions region 211 occupies space 253 of the data structure which is a subset of space 251. The active transactions region 211 contains active transactions waiting to be committed. The active transactions (not shown) within active transactions region 211 include a transaction header and a group of one or more allocation blocks to be updated as discussed below in FIG. 3.

Figure 3:
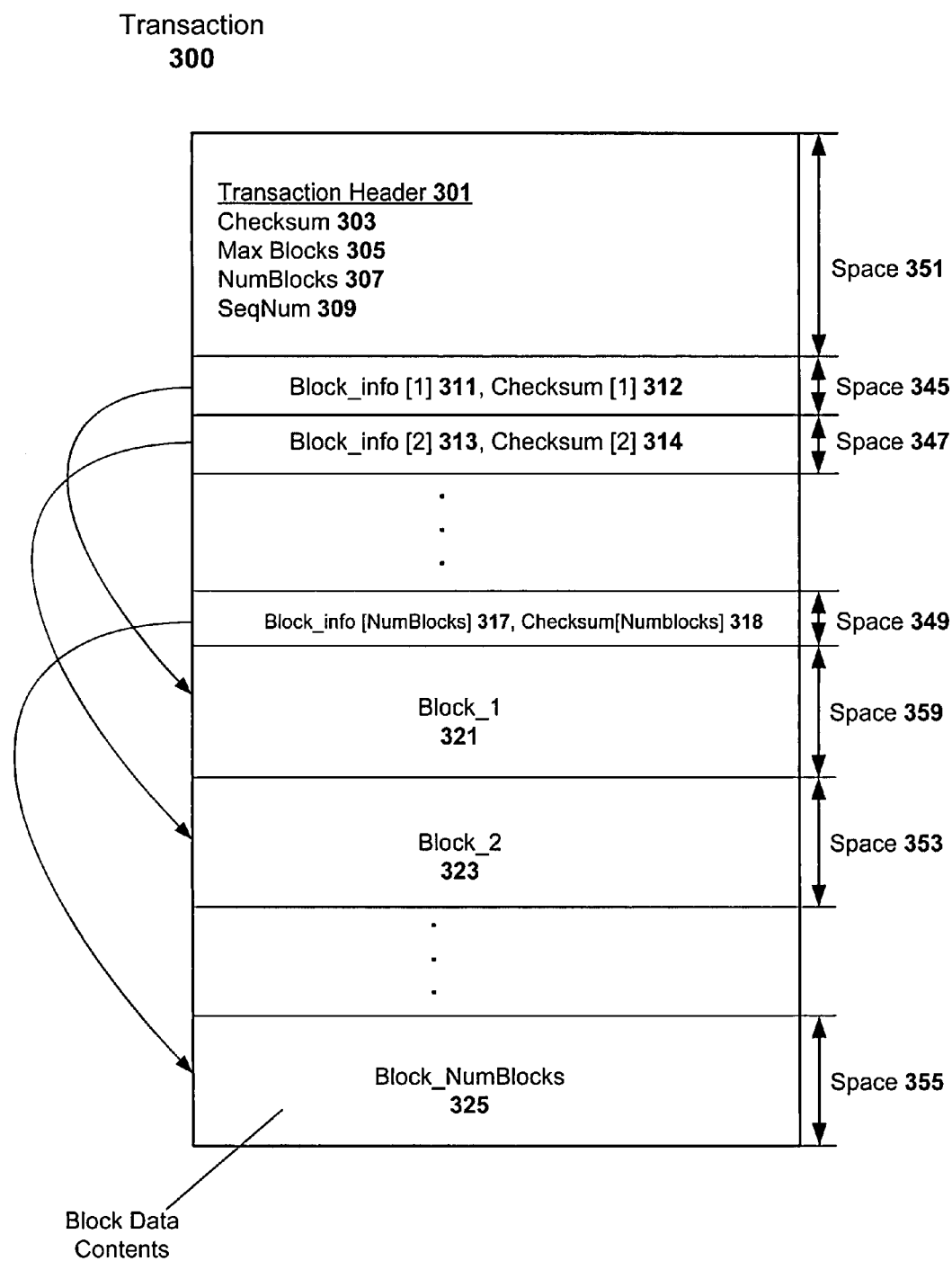
FIG. 3 illustrates an exemplary transaction according to one embodiment of the invention.

FIG. 3 illustrates an exemplary transaction according to one embodiment of the invention. Transaction 300 is located within the active transaction region, such as active transactions region 211 of FIG. 2. Transaction 300 includes transaction header 301 located within space 351 of the memory space allocated to the transaction. A single transaction may consist of several data blocks to be updated to their normal data structures on disk, including both the data to be written and the location where the data is to be written. This is represented on disk by the transaction header, which describes the number and sizes of the blocks, immediately followed by the contents of those blocks. Since the transaction headers are of limited size, a single transaction may consist of several transaction headers and their associated block contents (one transaction header followed by the contents of the blocks that header describes, then the next transaction header and its block contents, and so on). As discussed above, the journal buffer, in at least certain embodiments, is a circular buffer and transactions wrap around in this way.

Transaction header 301 includes checksum 303, max blocks 305, numblocks 307, and SeqNum 309. A journal checksum, such as checksum 303, is included in both the transaction header and the transaction info blocks discussed below. These checksums are included in order to facilitate validating transactions within journal buffer 209 of FIG. 2. A Checksum can be verified as part of a basic consistency check of their associated data structures. To verify a checksum, the checksum of each data structure is temporarily set to zero. A checksum operation is then performed to calculate the checksum of the data structure. Typically, a checksum routine is performed on one of the address, size, or data within a data block and should result in a value equal to the original value in the checksum field associated with each data structure. Max block 305 is a number indicating the maximum available data blocks for this particular transaction and numblocks 307 includes the actual number of data blocks within a particular transaction. As such, numblocks 307 varies depending on the number of changes required per transaction. Transaction 300 further includes block_info [1] 311, checksum [1] 312, block_ info [2] 313, checksum [2] 314, block_info [numblocks] 317, and checksum [Numblocks]. Each of data blocks [1] through [Numblocks] represents the actual data contents of the blocks. Block_info [1] 311 occupies space 345 of the transaction 300 data structure and references data block_1 321 which occupies space 359 of the data structure (reference is indicated by the arrow in the figure). Likewise, block_info [2] 313 and block_info [Numblocks] 317 reference data block_2 323 and data block_Numblocks 325 respectively.

Figure 4A:
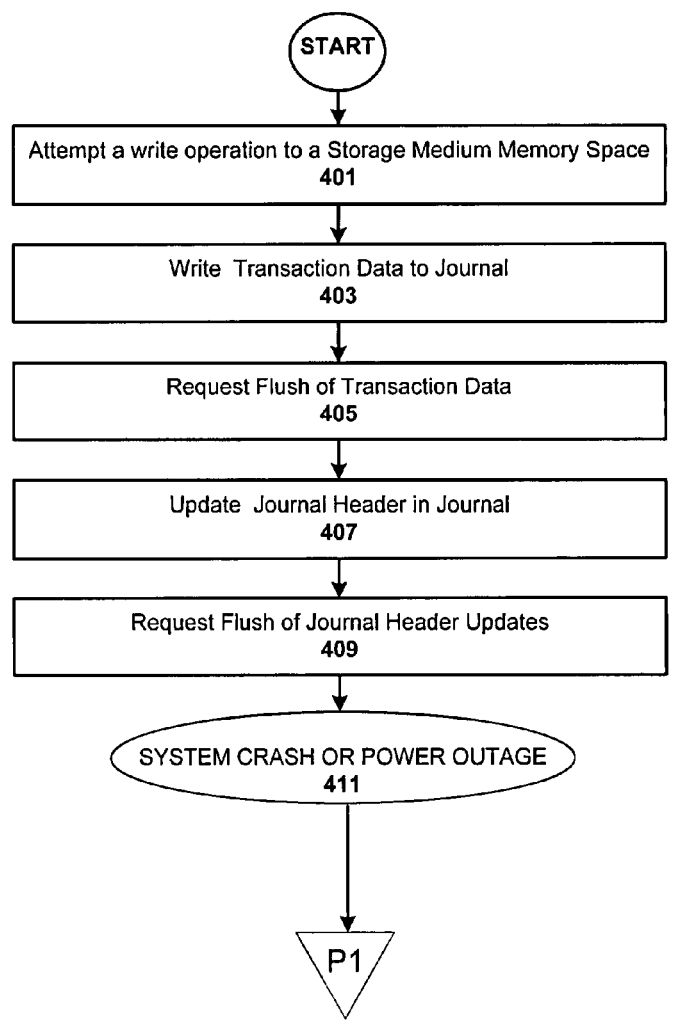
FIG. 4A illustrates an exemplary method of improving file system reliability on a storage medium after a data corrupting event using a file system journal.
Figure 5A:
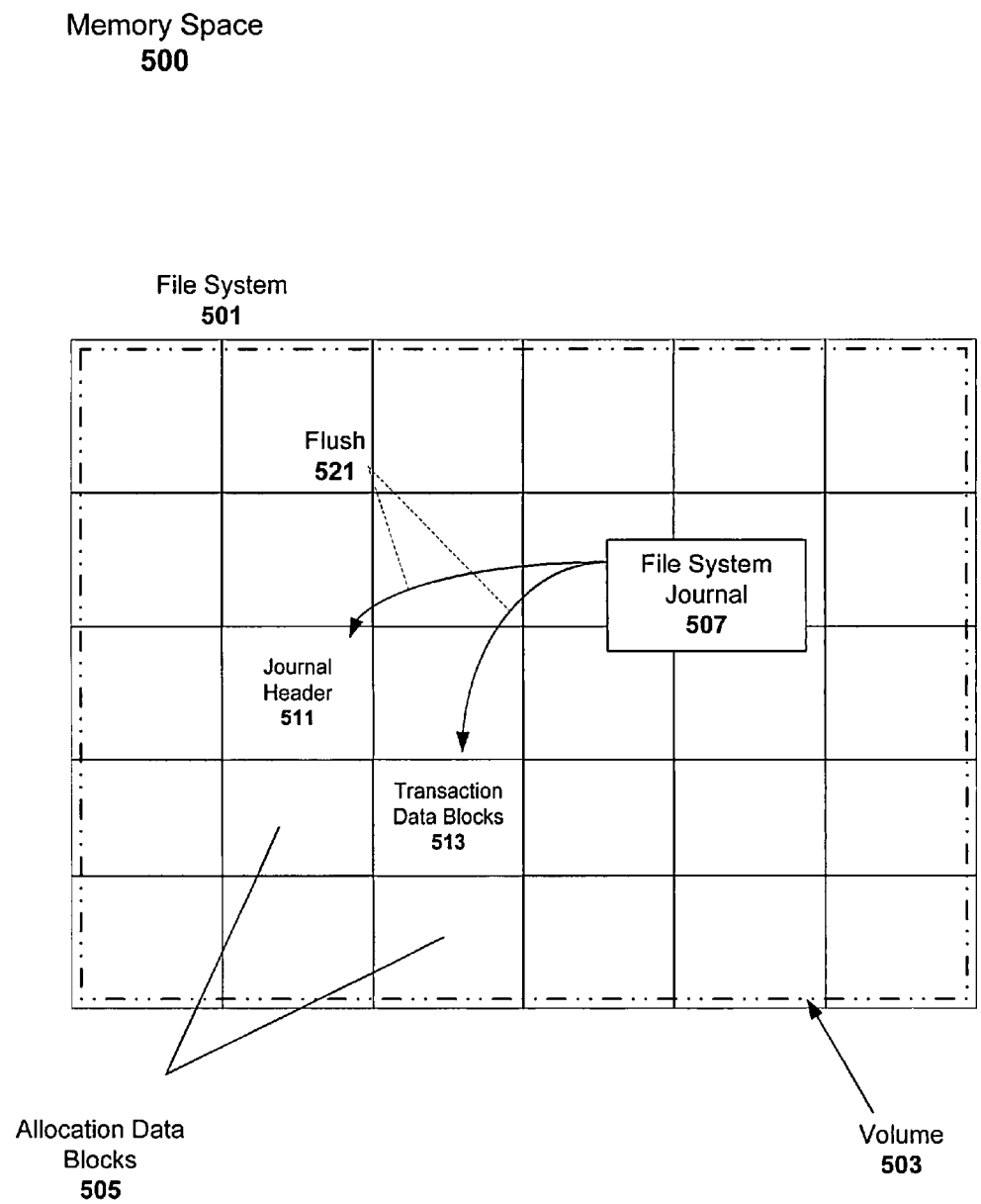
FIG. 5A illustrates an exemplary memory space containing a volume associated with a file system.
Figure 5B:
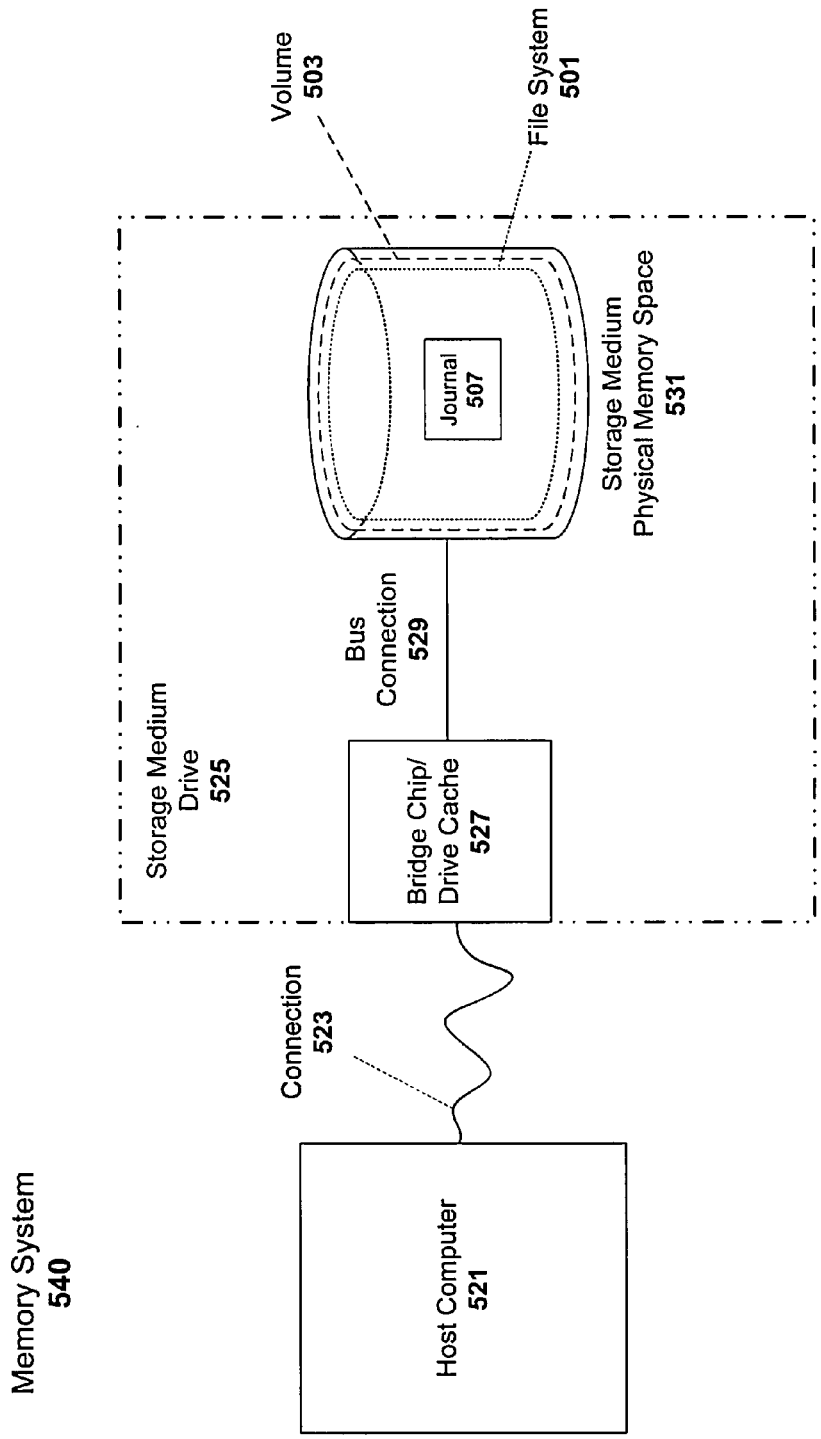
FIG. 5B illustrates an exemplary system for implementing the underlying principles of the invention.

FIG. 4A illustrates an exemplary method of improving file system reliability on a storage medium after a data corrupting event using a file system journal. Method 400 may be used within a memory system such as that of FIG. 5B. In FIG. 5B, which illustrates an exemplary memory system for implementing the underlying principles of the invention, memory system 540 includes a host computer 521 connected to a storage medium drive 525 via a connection 523. Storage medium drive 525 includes a bridge chip/drive cache 527, storage medium physical memory space 531 including file system 501 corresponding to volume 503, and a file system journal 507. Storage medium drive 525 further includes bus connection 529 for passing information between bridge chip 527 and storage medium physical memory space 531. Whenever a write operation takes place, an operating system (not shown) within host computer 521 sends write requests via connection 523 to storage medium drive 525. The write request is received, cached, and often re-ordered with other write requests, by bridge chip 527. Bridge chip 527 then passes the write operations to the files system journal 507 to be stored within storage medium physical memory space 531.

Method 400 begins with operation 401 where a host operating system attempts to perform a write operation to a storage medium memory space. The storage medium may be an internal boot drive medium or other storage medium drive and may include any type of machine-readable medium such as floppy disks, optical disks, CD-ROMS, magnetic-optical disks, read-only memories (ROMs), random access memories (RAMs), EPROMs, EEPROMs, flash memory, magnetic or optical cards, or any type of media suitable for storing electronic data. At operation 403, the transaction corresponding to the attempted write operation is written to the file system journal, such as file system journal 507 of FIGS. 5A-5C. The host operating system then requests a flush of the transaction data to the physical memory space of the storage medium at operation 405. A flush occurs when the data changes which are written to the file system journal are actually written to the physical memory space of the storage medium, such as storage medium physical memory space 531 shown in FIG. 5B. In FIG. 5A transaction data blocks 513 are flushed to an allocation block using flush 521.

At operation 407, the journal header is updated by performing another write operation to the file system journal. This updates the journal header within the file system journal. As discussed above, the journal header demarcates the active transactions region within the journal buffer, such as journal buffer 209, and contains references to where the active transitions begin and end. After the journal header is updated in the file system journal, the host operating system requests a flush of the journal header to the physical memory space of the storage medium at operation 409. This is also illustrated in FIG. 5A where journal header 511 is flushed to its allocation block within the physical memory space 500 corresponding to file system 501 which occupies volume 503. However, at step 411 a system crash or power outage occurs and it must be determined whether the storage medium honored the flush request. As previously discussed, many storage mediums available today cache and re-order write operations to improve performance benchmarks. As a result, many times a flush request is not honored by the storage medium. If a crash occurs before the journal header is flushed to the physical memory space, when the system is brought back on-line, the journal header may be grossly out of date. In such a case, many valid transactions may have been written and flushed to the physical memory space of the storage medium without updating the journal header to properly demarcate where these valid transactions are. This is shown in FIG. 5C, which illustrates an exemplary storage medium memory space where a flush request is not honored according to one embodiment of the invention. As indicated in FIG. 5C, flush 521 is successful in writing transaction data blocks 513, but is unsuccessful in writing journal header 511. In order to determine whether the storage medium honored the flush request, the host operating system should perform the operations of FIG. 4B.

Figure 4B:
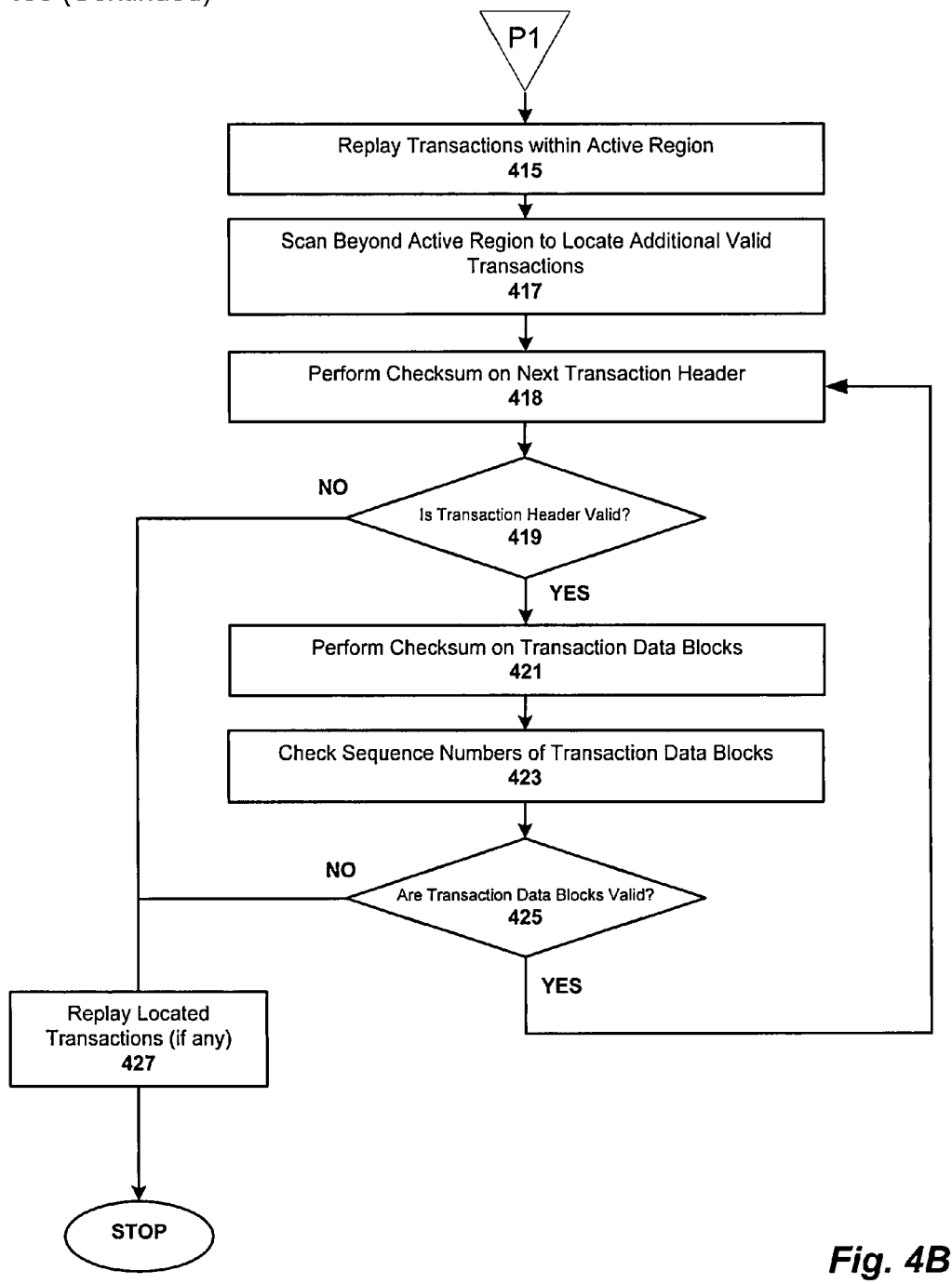
FIG. 4B illustrates an exemplary method of improving file system reliability on a storage medium after a data corrupting event using a file system journal.
Figure 5C:
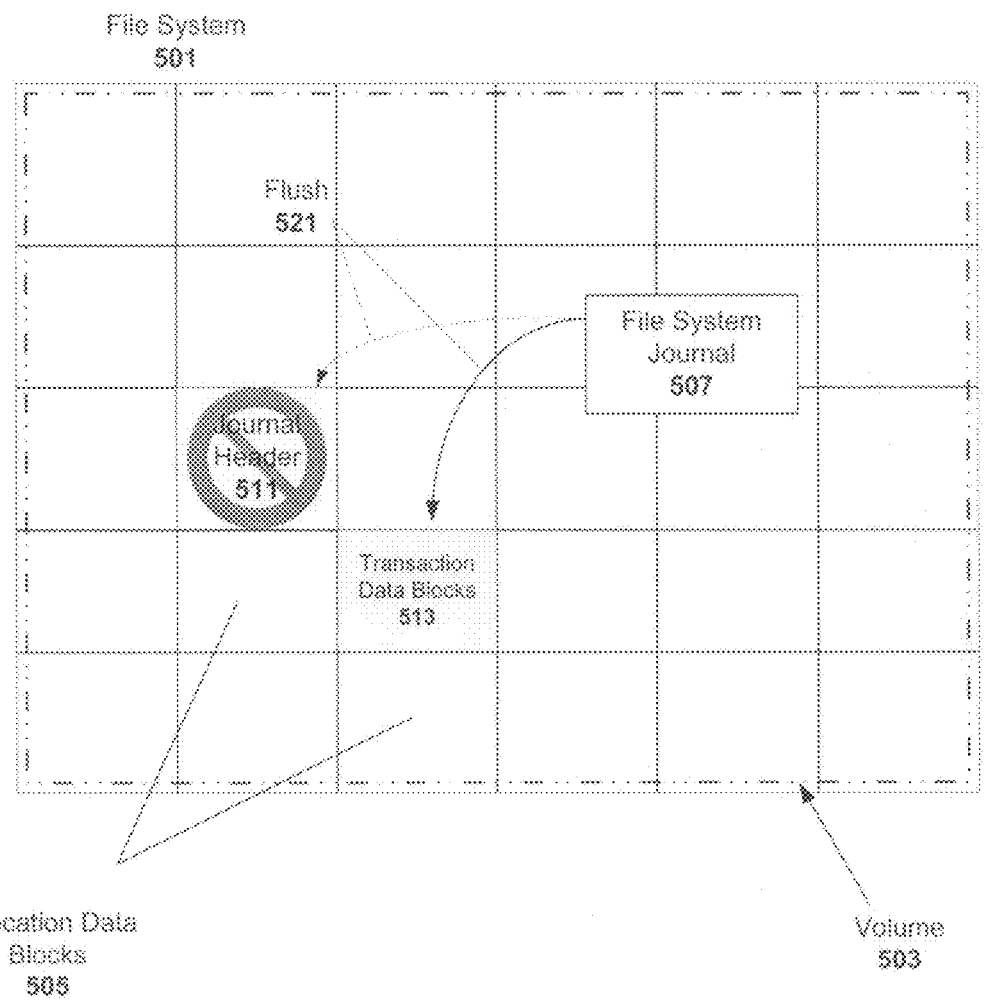
FIG. 5C illustrates an exemplary storage medium memory space where a flush request is not honored according to one embodiment of the invention.
Figure 6A:
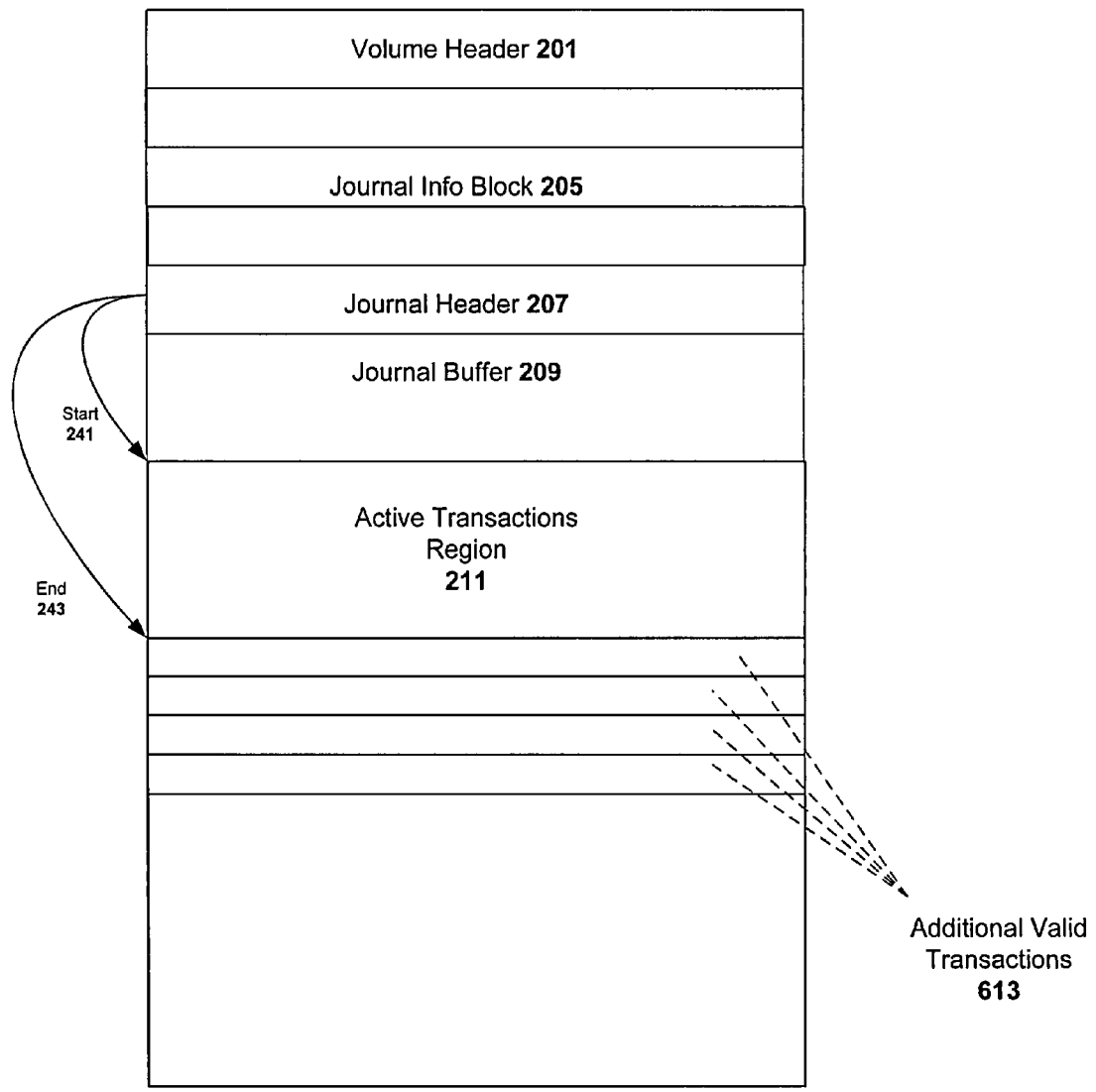
FIG. 6A illustrates additional valid transactions within an exemplary file system journal located on a storage medium according to one embodiment of the invention.

FIG. 4B illustrates an exemplary method of improving file system reliability on a storage medium after a data corrupting event using a file system journal. At operation 415, the host operating system replays the transactions within the active region demarcated by the journal header (which may be grossly out of date). Additionally, at operation 417, the host operating system further scans transaction beyond the active region (demarcated by the possibly out-of-date journal header) to locate additional valid transactions, if any. This scenario is shown in FIG. 6A, which illustrates additional valid transactions within an exemplary file system journal located on a storage medium according to one embodiment of the invention. In FIG. 6A journal header 207 has not been updated and demarcates active transactions regions 211. Additional valid transactions 613 are shown even though journal header 207 has not been updated. These additional transactions must be located and replayed in order to properly update journal header 207. The locating of these transactions includes scanning and validating transactions beyond the active transactions region 211. These additional transactions are validated by first performing a checksum on the transaction header at operation 418, and determining, at operation 419, whether the transaction header is valid. If the checksum of the transaction header matches the checksum value, such as checksum 303 of FIG. 3B, stored within the transaction header, then the control flows to operation 421 where the checksum operation is performed upon each of the data blocks within the transaction to confirm that the entire transaction is valid and contains valid data. Operation 423 is then performed on each of the transaction data blocks to confirm that the sequence number, such as SeqNum 309 of FIG. 3B, is greater than the previous sequence number of a previously validated data block. Each transaction includes a sequence number in an increasing order. So, if the sequence number corresponding to a transaction data block is not greater than the sequence number of the previous transaction data block, then the sequence number likely corresponds to an old transaction in the journal buffer which has already been written to disk and can be ignored.

Figure 6B:
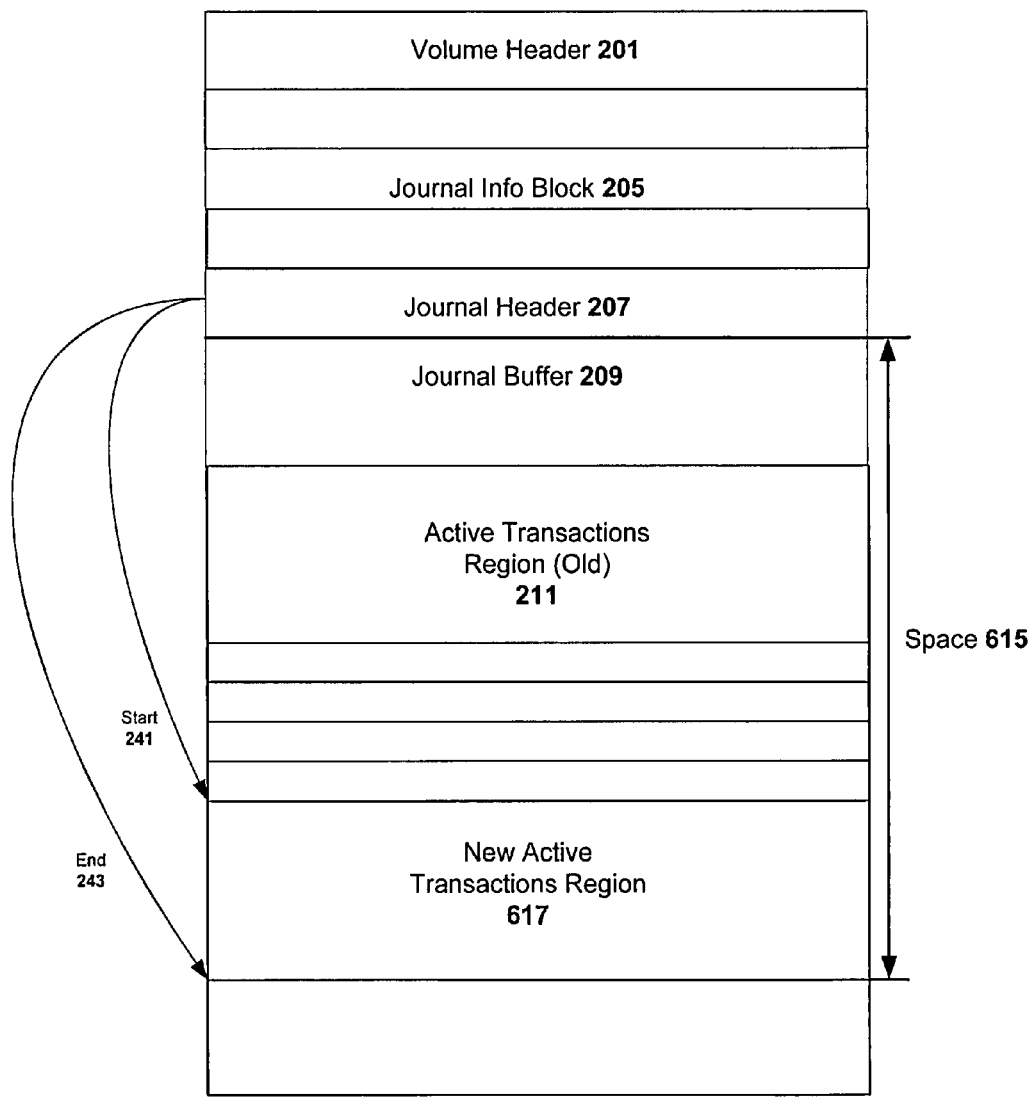
FIG. 6B illustrates an updated journal header within an exemplary file system journal located on a storage medium according to one embodiment of the invention.

Control flows to operation 425 where it is determined whether each of the transaction data blocks is valid by checking the checksum and the sequence number as discussed above. If each of the data blocks within the transaction are valid at operation 425, then the host processor moves on to scan the next transaction, and so forth until an invalid transaction is reached. If, on the other hand, the transaction header is not valid at operation 419 or one or more of the transaction data blocks are not valid at operation 425, then the transaction is invalid and control flows to operation 427 where any valid transactions previously located, if any, are replayed to bring the journal header up-to-date and return the storage medium to a consistent state. This is shown in FIG. 6B, which illustrates an updated journal header within an exemplary file system journal located on a storage medium according to one embodiment of the invention.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Accordingly, the scope and spirit of the invention should be judged in terms of the claims which follow.

What is claimed is:

1. A method of improving file system reliability on a storage medium after a data corrupting event using a journal for a file system comprising:
   identifying an active transaction region in the journal, wherein the active transaction region includes a first valid transaction defining one or more changes to be made to the file system, and the location of the active transaction region in the journal is specified by a start location and an end location stored in a journal header;
   replaying the first valid transaction;
   determining whether the journal contains a second valid transaction beginning at a location beyond the end location specified in the journal header;
   wherein determining whether the journal contains a second valid transaction comprises scanning the journal until a transaction is reached that contains at least one invalid component and validating the second valid transaction; and
   replaying the second valid transaction in response to determining that the journal contains the second valid transaction, wherein the replaying comprises making changes to the file system based upon the second valid transaction, and the validating comprises:
   performing a checksum operation on a data block within the second valid transaction; and
   identifying the second valid transaction as valid if the result of the checksum operation is equal to a checksum value stored in a journal info block corresponding to the component and a sequence number stored in the journal info block is greater than a previous sequence number of a previously validated component.

2. The method of claim 1, wherein the storage medium is an external, removable medium, and wherein determining whether the journal contains a second valid transaction comprises scanning the journal until a transaction is reached that is not valid.

3. The method of claim 1, wherein the previously validated component comprises a previously validated transaction.

4. The method of claim 1, wherein the second transaction includes at least a transaction header and associated data blocks.

5. The method of claim 3, wherein the data structure is a block info data structure.

6. The method of claim 1, wherein the journal header is not properly updated when the second transaction is written to physical media because a request received by the storage medium to flush data changes corresponding to the journal header to the physical medium is ignored by the storage medium.

7. The method of claim 1, wherein the data corrupting event is a power outage or system crash that occurs during a write operation before the storage medium reaches a consistent state.

8. A non-transitory machine-readable storage medium that provides instructions, which when executed by a machine, cause the machine to perform a method of restoring a storage medium to a consistent state after a data corrupting event using a journal for a file system in the storage medium, the method comprising:
   identifying an active transaction region in the journal, wherein the active transaction region includes a first valid transaction defining one or more changes to be made to the file system, and the location of the active transaction region in the journal is specified by a start location and an end location stored in a journal header;

replaying the first valid transaction;

determining whether the journal contains a second valid transaction beginning at a location beyond the end location specified in the journal header;

wherein determining whether the journal contains a second valid transaction comprises scanning the journal until a transaction is reached that contains at least one invalid component and validating the second valid transaction; and replaying the second valid transaction in response to determining that the journal contains the second valid transaction, wherein the replaying comprises making changes to the file system based upon the second valid transaction, and the validating comprises:

performing a checksum operation on a data block within the second valid transaction; and identifying the second valid transaction as valid if the result of the checksum operation is equal to a checksum value stored in a journal info block corresponding to the component and a sequence number stored in the journal info block is greater than a previous sequence number of a previously validated component.

9. The medium of claim 8, determining whether the journal contains a second valid transaction comprises scanning the journal until a transaction is reached that is not valid.

10. The medium of claim 8, wherein determining whether the journal contains a second valid transaction comprises validating the components of the additional transaction and wherein the validating comprises:

performing a checksum operation on the second valid transaction; and identifying the second valid transaction as valid if the result of the checksum operation is equal to a checksum value stored in a data structure corresponding to the transaction and a sequence number stored in the data structure corresponding to the transaction is greater than a previous sequence number of a previously validated transaction.

11. The medium of claim 10, wherein the components of the second transaction include at least a transaction header and associated data blocks.

12. The medium of claim 8, wherein the journal header is not properly updated when the second transaction is written to physical media because a request received by the storage medium to flush data changes corresponding to the journal header to the physical medium is ignored by the storage medium.

13. The medium of claim 12, wherein the data corrupting event is a power outage or system crash that occurs during a write operation before the storage medium reaches a consistent state.

14. An apparatus comprising:

a storage medium storing a journal;

a host processor coupled to the storage medium, the host processor configured to:

identifying an active transaction region in the journal, wherein the active transaction region includes a first valid transaction defining one or more changes to be made to the file system, and the location of the active transaction region in the journal is specified by a start location and an end location stored in a journal header;

replaying the first valid transaction;

determining whether the journal contains a second valid transaction beginning at a location beyond the end location specified in the journal header;

wherein determining whether the journal contains a second valid transaction comprises scanning the journal until a transaction is reached that contains at least one invalid component and validating the second valid transaction; and replay the second valid transaction in response to determining that the journal contains the second valid transaction, wherein the replaying comprises making changes to the file system based upon the second valid transaction, and the validating comprises:

performing a checksum operation on a data block within the second valid transaction; and identifying the second valid transaction as valid if the result of the checksum operation is equal to a checksum value stored in a journal info block corresponding to the component and a sequence number stored in the journal info block is greater than a previous sequence number of a previously validated component.

15. The apparatus of claim 14, wherein the storage medium device is an external, removable medium, and wherein determining whether the journal contains a second valid transaction comprises scanning the journal until a transaction is reached that is not valid.

16. The apparatus of claim 14, wherein the host processor is further configured to validate components of the second transaction, wherein the components include at least a transaction header and associated data blocks.

17. The apparatus of claim 16, wherein validating the components comprises:

performing a checksum operation on each component of the second transaction; and identifying the second transaction as valid if the result of the checksum operation is equal to a checksum value stored in a data structure corresponding to the component and a sequence number stored in the data structure is greater than a previous sequence number of a previously validated component.

18. The apparatus of claim 14, wherein the journal header is not properly updated when the second valid transaction is written to physical media because a request received by the storage medium to flush data changes corresponding to the journal header to the physical medium is ignored by the storage medium.

19. A means for improving file system reliability on a storage medium after a data corrupting event using a journal for a file system comprising:

means for identifying an active transaction region in the journal, wherein the active transaction region includes a first valid transaction defining one or more changes to be made to the file system, and the location of the active transaction region in the journal is specified by a start location and an end location stored in a journal header;

means for replaying the first valid transaction;

means for determining whether the journal contains a second valid transaction beginning at a location beyond the end location specified in the journal header;

wherein determining whether the journal contains a second valid transaction comprises scanning the journal until a transaction is reached that contains at least one invalid component and validating the second valid transaction; and means for replaying the second valid transaction in response to determining that the journal contains the second valid transaction, wherein the replaying comprises making changes to the file system based upon the second valid transaction, and the validating comprises:

means for performing a checksum operation on a data block within the second valid transaction; and means for identifying the second valid transaction as valid if the result of the checksum operation is equal to a checksum value stored in a journal info block corresponding to the component and a sequence number stored in the journal info block is greater than a previous sequence number of a previously validated component.

* * * * *

UNITED STATES PATENT AND TRADEMARK OFFICE
CERTIFICATE OF CORRECTION

PATENT NO. : 8,615,496 B2  
APPLICATION NO. : 11/975598  
DATED : December 24, 2013  
INVENTOR(S) : Dominic Giampaolo Page 1 of 1

It is certified that error appears in the above-identified patent and that said Letters Patent is hereby corrected as shown below:

In the Claims:

Column 10, claim 1, line 13, reads: "made to the file system, and the location of the active"  
Column 10, claim 1, line 13, should read: "made to the file system, and a location of the active"

Column 11, claim 8, line 2, reads: "made to the file system, and the location of the active"  
Column 11, claim 8, line 2, should read: "made to the file system, and a location of the active"

Column 11, claim 9, line 28, reads: "9. The medium of claim 8, determining whether the journal"  
Column 11, claim 9, line 28, should read: "9. The medium of claim 8, wherein determining whether the journal"

Column 11, claim 10, line 33, reads: "validating the components of the additional transaction and"  
Column 11, claim 10, line 33, should read: "validating components of the second transaction and"

Column 11, claim 14, line 61, reads: "identifying an active transaction region in the journal,"  
Column 11, claim 14, line 61, should read: "identify an active transaction region in a journal, for a file system on the storage medium after a data corrupting event,"

Column 11, claim 14, line 67, reads: "replaying the first valid transaction;"  
Column 11, claim 14, line 67, should read: "replay the first valid transaction;"

Column 11, claim 14, line 64, reads: "made to the file system, and the location of the active"  
Column 11, claim 14, line 64, should read: "made to the file system, and a location of the active"

Column 12, claim 14, line 1, reads: "determining whether the journal contains a second valid"  
Column 12, claim 14, line 1, should read: "determine whether the journal contains a second valid"

Signed and Sealed this  
Sixteenth Day of September, 2014

Michelle K. Lee  
*Deputy Director of the United States Patent and Trademark Office*